US 6,689,332 B1

(12) United States Patent
Yoshida et al.

(10) Patent No.: US 6,689,332 B1
(45) Date of Patent: *Feb. 10, 2004

(54) PROCESS FOR REMOVING CARBON DIOXIDE FROM COMBUSTION GASES

(75) Inventors: Kunihiko Yoshida, Osaka (JP); Tomio Mimura, Osaka (JP); Shigeru Shimojo, Osaka (JP); Mutsunori Karasaki, Tokyo (JP); Masaki Iijima, Tokyo (JP); Shigeaki Mitsuoka, Hiroshima-ken (JP)

(73) Assignees: The Kansai Electric Power Co, Inc., Osaka (JP); Mitsubishi Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 08/603,186

(22) Filed: Feb. 20, 1996

Related U.S. Application Data

(63) Continuation of application No. 08/322,525, filed on Oct. 17, 1994, now abandoned, which is a continuation of application No. 08/120,763, filed on Sep. 15, 1993, now abandoned.

(30) Foreign Application Priority Data

Sep. 16, 1992 (JP) ............................................. 4/246397

(51) Int. Cl.⁷ .............................................. B01D 53/62
(52) U.S. Cl. ...................... 423/220; 423/228; 423/229
(58) Field of Search ................... 423/220, 228, 423/229; 252/387; 106/14.05

(56) References Cited

U.S. PATENT DOCUMENTS

| 3,622,267 A | 11/1971 | Bartholome | ................ 23/2 R |
|---|---|---|---|
| 4,079,117 A | * 3/1978 | Butwell | ................ 423/228 |
| 4,112,050 A | 9/1978 | Sartori et al. | ................ 423/223 |
| 4,112,051 A | 9/1978 | Sartori et al. | ................ 423/223 |
| 4,112,052 A | 9/1978 | Sartori et al. | ................ 423/228 |
| 4,217,236 A | * 8/1980 | Sartori et al. | ................ 423/229 |
| 4,217,237 A | 8/1980 | Sartori et al. | ................ 252/192 |
| 4,217,238 A | * 8/1980 | Sartori et al. | ................ 252/192 |

(List continued on next page.)

FOREIGN PATENT DOCUMENTS

| DE | 1 542 415 | 4/1970 |
| DE | 1 904 128 | 8/1970 |
| EP | 0 102 712 | 3/1974 |
| GB | 2 156 327 | 10/1985 |
| GB | 2 191 419 | 12/1987 |
| JP | 52-63171 | 5/1977 |
| JP | 61-71819 | 4/1986 |

OTHER PUBLICATIONS

Chemical Engineering Science, vol. 41, No. 2, pp. 405–408, 1986.
Chemical Engineering Science, vol. 41, No. 4, pp. 997–1003, 1986.

Primary Examiner—Stanley S. Silverman
Assistant Examiner—Timothy C. Vanoy
(74) Attorney, Agent, or Firm—Jacobson Holman PLLC

(57) ABSTRACT

A process for removing $CO_2$ from a combustion gas which comprises bringing a combustion gas containing oxygen and $CO_2$ and a $CO_2$ absorbent solution into contact at the atmospheric pressure, thereby allowing the $CO_2$ absorbent solution to absorb $CO_2$ from the combustion gas, and, in the ensuing step, heating the absorbent solution that has absorbed $CO_2$ to liberate $CO_2$ and regenerate the $CO_2$ absorbent solution, and circulating the regenerated solution for reuse. An aqueous solution of a hindered amine selected from the group consisting of 2-amino-2-methyl-1-propanol (AMP), 2-(ethylamino)-ethanol (EAE), 2-(methylamino)-ethanol (MAE), and 2-(diethylamino)-ethanol (DEAE) is used as the $CO_2$ absorbent solution, and carbon steel is used in building the members of the equipment that contact the aqueous hindered amine solution. The absorbent solution contains cupric carbonate which is a corrosion inhibitor.

12 Claims, 2 Drawing Sheets

U.S. PATENT DOCUMENTS

| | | | |
|---|---|---|---|
| 4,240,922 A | * 12/1980 | Sartori et al. | 252/189 |
| 4,240,923 A | 12/1980 | Sartori et al. | 252/189 |
| 4,251,494 A | 2/1981 | Say | 423/228 |
| 4,336,233 A | 6/1982 | Appl et al. | 423/228 |
| 4,405,811 A | * 9/1983 | Stogryn et al. | 564/506 |
| 4,440,731 A | * 4/1984 | Pearce | 423/228 |
| 4,714,597 A | 12/1987 | Trevino | 423/228 |
| 4,729,883 A | * 3/1988 | Lam et al. | 423/228 |
| 6,500,397 B1 | * 12/2002 | Yoshida et al. | 423/228 |

* cited by examiner

F I G. 2
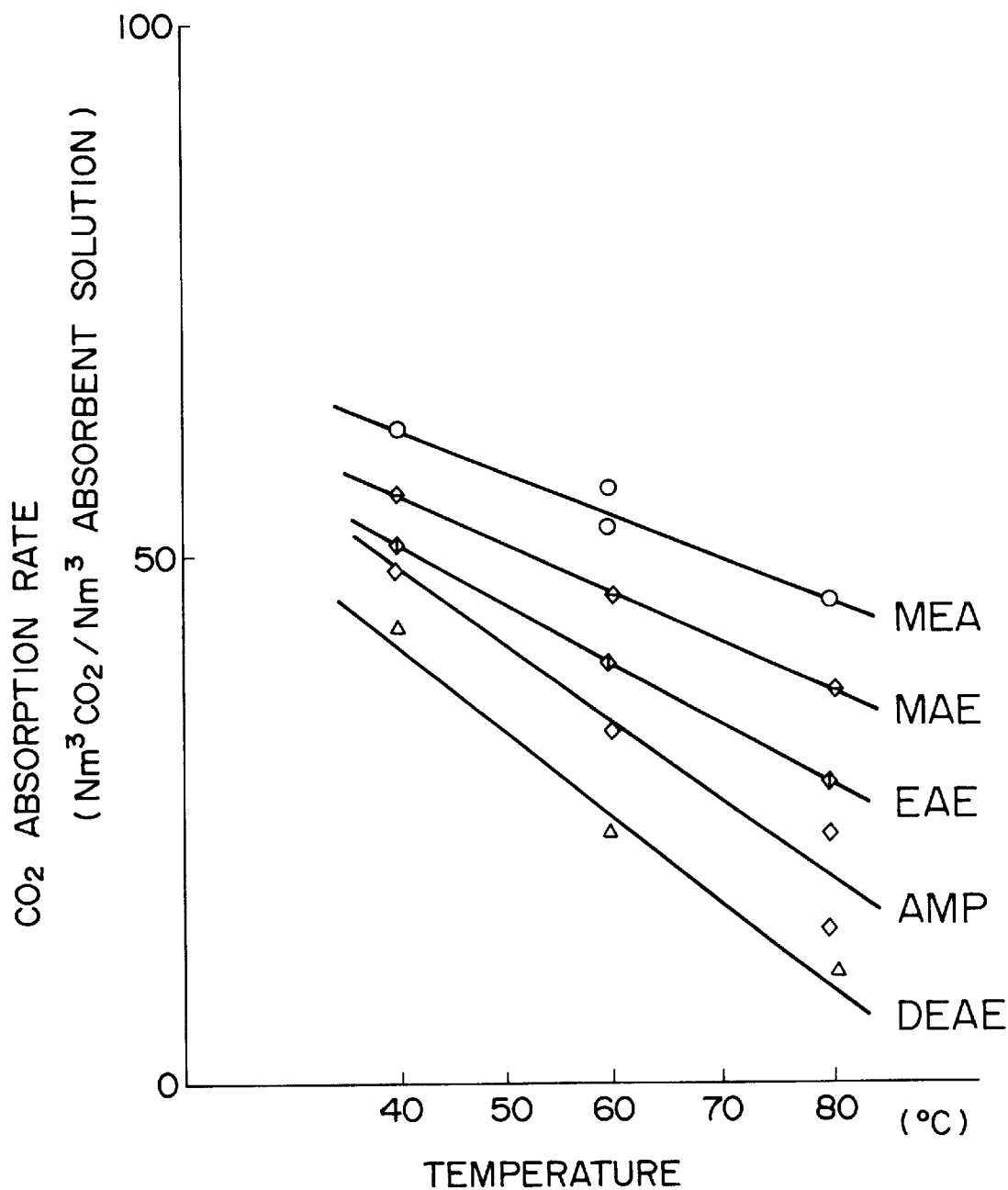

PROCESS FOR REMOVING CARBON DIOXIDE FROM COMBUSTION GASES

This is a Continuation of application Ser. No. 08/322,525, filed Oct. 17, 1994 which was abandoned upon the filing hereof; which in turn is a continuation of application Ser. No. 08/120,763, filed Sep. 15, 1993, which is abandoned.

FIELD OF THE INVENTION AND RELATED ART STATEMENT

This invention relates to a process for removing carbon dioxide ($CO_2$) from combustion gases. More particularly, it relates to a process for removing $CO_2$ from combustion gases which contain oxygen and $CO_2$ at atmospheric pressure, using an aqueous solution of a specific hindered amine solution as a $CO_2$ absorbent solution and also using a specific material for the equipment that contacts the solution.

In recent years the greenhouse effect of $CO_2$ has attracted attention as a factor responsible for the global warming. Counteracting this effect is urgently needed throughout the world to protect the global environment. The source of $CO_2$ is omnipresent in the whole areas of human activities that involve the combustion of fossil fuels, and the tendency is toward stricter emission control than heretofore. In view of these, energetic studies are under way on the removal and recovery of $CO_2$ from combustion gases, especially from those emitted by power-generating installations such as steam power plants that burn enormous quantities of fossil fuels, and on the storage of the recovered $CO_2$ without release to the atmosphere. For example, methods of contacting combustion gases from boilers with alkanolamine solution etc. have been studied.

Examples of the alkanolamine are monoethanolamine, diethanolamine, triethanolamine, methyldiethanolamine, diisopropanolamine, and diglycolamine. Usually, monoethanolamine (MEA) is used by preference.

A variety of techniques are known for separating acidic gases from various mixed gases by the use of amine compounds.

Japanese Patent Application Disclosure No. SHO 53-100180 describes a process for acid gas removal which comprises bringing a normally gaseous mixture into contact with an amine-solvent liquid absorbent composed of (1) an amine mixture consisting of at least 50 mol % of a sterically hindered amine containing at least either one secondary amino group which forms a part of a ring and is bound to a secondary carbon atom or a tertiary carbon atom or one primary amino group bound to a tertiary carbon atom and at least about 10 mol % of a tertiary amino-alcohol and (2) a solvent for the above amine mixture which is a physical absorbent for acid gases.

Examples of the sterically hindered amine cited are 2-piperidine ethanol and the like, those of the tertiary amino-alcohol are 3-dimethylamino-1-propanol and the like, and those of the solvent are sulfoxide compounds which may contain up to 25 wt % of water. As an example of the gas to be treated, the printed publication, page 11, upper left column refers to "a normally gaseous mixture containing high concentrations of carbon dioxide and hydrogen sulfide, e.g., 35% $CO_2$ and 10–12% $H_2S$". Working examples of the invention used $CO_2$ itself.

Patent Application Disclosure No. SHO 61-71819 introduces an acid-gas scrubbing composition containing a sterically hindered amine and a nonaqueous solvent such as sulfolane. As a sterically hindered primary monoaminoalcohol, 2-amino-2-methyl-1-propanol (AMP) and the like are given as examples and employed. Working examples of the invention use $CO_2$-nitrogen and $CO_2$-helium combinations as gases to be treated. Aqueous solutions of amine and potassium carbonate and the like are used as absorbents. The printed publication mentions the use of water too. It further explains the benefit of the sterically hindered amine by means of a reaction formula.

*Chemical Engineering Science*, vol. 41, No. 4, pp. 997–1003, discloses the behavior of the aqueous solution of AMP as a hindered amine in the absorption of carbonic acid gas. The gases used for the absorption experiment were $CO_2$ and a $CO_2$-nitrogen mixture at the atmospheric pressure.

*Chemical Engineering Science*, vol. 41, No. 2, pp. 405–408, reports the $CO_2$ and $H_2S$ absorption rates of aqueous solutions of a hindered amine such as AMP and a straight-chain amine such as MEA at about the ordinary temperature. According to the report, the two aqueous solutions do not differ appreciably in the absorbent concentration range of 0.1–0.3 M when the partial pressure of $CO_2$ is 1 atm. However, when aqueous solutions at a concentration of 0.1 M was used and the $CO_2$ partial pressure was reduced from 1 atm. to 0.5 and 0.05 atm., the absorption rate of AMP decreased substantially below that of MEA at 0.05 atm.

U.S. Pat. No. 3,622,267 teaches a technique of purifying a synthetic gas containing $CO_2$ at a high partial pressure, e.g., 30% $CO_2$ at 40 atm., such as the gas synthesized by partial oxidation of crude oil, using an aqueous mixture containing methyl diethanolamine and monoethyl monoethanolamine.

German Patent Disclosure No. 1,542,415 reveals a technique of adding monoalkylalkanolamines and the like to physical or chemical absorbents so as to enhance the rates of absorption of $CO_2$, $H_2S$, and COS. Likewise, German Patent Disclosure No. 1,904,428 teaches the addition of monomethylethanolamine for the improvement of the absorption rate of methyldiethanolamine.

U.S. Pat. No. 4,336,233 discloses a technique by which an aqueous solution of piperazine at a concentration of 0.81–1.3 mol/l or an aqueous solution of piperazine and a solvent such as methyldiethanolamine, triethanolamine, diethanolamine, or monomethylethanolamine is used as a scrubbing solution for the purification of natural, synthetic, or gasified coal gas.

Similarly, Japanese Patent Application Disclosure No. SHO 52-63171 sets forth $CO_2$ absorbents prepared by adding piperazine or a piperazine derivative such as hydroxyethylpiperazine as an accelerator to a tertiary alkanolamine, monoalkylalkanolamine or the like.

The aqueous MEA solution, used in continuous removal of $CO_2$ by absorption through gas-liquid contact with high-temperature combustion gas that contains oxygen and $CO_2$, would cause a corrosion problem. The $CO_2$ absorption column in which the combustion gas containing $CO_2$ and oxygen comes in contact with the absorbent solution, the regeneration column that heats the absorbent solution to liberate $CO_2$ and thereby regenerate the solution, and pipings, heat exchangers, pumps, and all other metallic components located between and around those two columns can be corrosively attacked. Equipment designs using the conventional materials for chemical plants might be implemented in laboratories but would never be feasible for industrial-scale processes because of a too short service life.

A proposal has been made in U.S. Pat. No. 4,440,731 to overcome the corrosion of the equipment where $CO_2$ is taken up from combustion gases containing oxygen and $CO_2$ by the use of a $CO_2$ absorbent solution which consists of an aqueous solution of MEA or other similar compound.

According to the proposal, at least 50 ppm of bivalent copper ion is added to such an absorbent solution, with or without the further addition of dihydroxyethylglycine, a carbonate of an alkali metal, a permanganate of an alkali metal or ammonium, a thiocyanate of an alkali metal carbonate or ammonium, an oxide of nickel or bismuth, or the like. The method is claimed to inhibit the decomposition of the absorbent MEA or the like even during the treatment of combustion gases containing a high concentration of oxygen.

Working examples of this U.S. patent actually describe tests with only an aqueous solution of MEA as a sole amine compound. To be more exact, 30 lbs. of $CO_2$ and 15 lbs. of oxygen were supplied to an aqueous solution of 30% MEA being refluxed, and corrosion promotion tests were conducted with mild steel coupons in the presence of various corrosion inhibitors at 130° C. It is reported that the addition of 200 ppm cupric carbonate [$CuCO_3 \cdot Cu(OH)_2 \cdot H_2O$, $CuCO_3$ accounting for 56% of the total amount] inhibited the corrosion to 0.9–1.2 mil/y (mpy) whereas the corrosion in the absence of such an inhibitor was 40–52 mpy.

OBJECT AND SUMMARY OF THE INVENTION

In resisting the corrosive attack of an absorbent solution, stainless steel is naturally superior to carbon steel. This apparently favors the use of stainless steel as the equipment material. However, an equipment of stainless steel costs several times more than that of carbon steel. It is for this reason that a $CO_2$ absorbent having the least possible corrosive action on carbon steel is desired. The aforedescribed techniques of the prior art for separating acidic gases from various mixed gases by the use of an amine compound teach nothing as to the $CO_2$ absorption from combustion gases that contain oxygen and $CO_2$ at the atmospheric pressure by an equipment built of carbon steel members, while preventing the corrosion of the equipment.

The method of the above-mentioned U.S. Pat. No. 4,440,731 that absorbs $CO_2$ from combustion gases using one of the specific absorbents while avoiding the corrosion is fairly effective. There is room, nevertheless, for further improvement in corrosion resistance to extend the life span of the equipment.

A $CO_2$ absorbent with the least possible corrosive action on carbon steel is desired, of course, to exhibit high $CO_2$ absorption performance at a low $CO_2$ partial pressure such as of combustion gas, i.e., a high $CO_2$ absorption rate per given amount of an aqueous absorbent solution at a given concentration, a high $CO_2$ absorption rate per unit absorbent mole of an aqueous absorbent solution at a given concentration, a high $CO_2$ absorption velocity at a given concentration, and a small energy requirement for the regeneration of the aqueous absorbent solution that has absorbed $CO_2$.

In view of these problems of the prior art, the present inventors have intensively searched for a $CO_2$ absorbent which is little corrosive to carbon steel and yet performs $CO_2$ absorption excellently. It has now been found that, under the conditions for $CO_2$ absorption from oxygen-containing combustion gases, an aqueous hindered amine solution has an extremely weak corroding action on carbon steel and is superior in absorption performance to the ordinary aqueous MEA solution. This finding has just led to the perfection of the present invention.

It has also been found that the addition of the cupric carbonate used in the U.S. Pat. No. 4,440,731 to the aqueous hindered amine solution lessens the already limited corroding action of the solution on carbon steel.

Thus, the present invention provides a process for removing carbon dioxide from a combustion gas which comprises bringing a combustion gas containing oxygen and carbon dioxide and a carbon dioxide absorbent solution into contact at the atmospheric pressure, thereby allowing the carbon dioxide absorbent solution to absorb carbon dioxide from the combustion gas, and, in the ensuing step, heating the absorbent solution that has absorbed carbon dioxide to liberate carbon dioxide and regenerate the carbon dioxide absorbent solution, and circulating the regenerated solution for reuse, said carbon dioxide absorbent solution being an aqueous hindered amine solution, and the members of the equipment that contact the aqueous hindered amine solution being built of carbon steel.

The present invention is most preferably embodied when the hindered amine used is an amine compound selected from the classes (excluding the compounds having two or more amino groups) consisting of (A) compounds having in the molecule an alcoholic hydroxyl group and a primary amino group, said primary amino group being bound to a tertiary carbon atom having two unsubstituted alkyl groups, (B) compounds having in the molecule an alcoholic hydroxyl group and a secondary amino group, said secondary amino group having an N atom bound to a group which has a chain of two or more carbon atoms including the binding carbon atom and an unsubstituted alkyl group which contains 3 or fewer carbon atoms, and (C) compounds having in the molecule an alcoholic hydroxyl group and a tertiary amino group, at least two groups bound to the tertiary amino group each having a chain of two or more carbon atoms including the binding carbon atom, two of the groups bound to the tertiary amino group being unsubstituted alkyl groups.

In the present invention it is especially desirable that the carbon dioxide absorbent solution contain cupric carbonate to improve the corrosion resistance of the equipment.

The hindered amine to be used in the invention desirably is one containing an alcoholic hydroxyl group in the molecule. Particularly desirable one is chosen from among the amine compounds (excluding those having two or more amino groups) of the classes (A), (B), and (C) above. It is beneficial that such an amine compound has one alcoholic hydroxyl group in the molecule.

Out of the hindered amines that can be used for the present invention, (A) the compounds having in the molecule an alcoholic hydroxyl group and a primary amino group, said primary amino group being bound to a tertiary carbon atom having two unsubstituted alkyl groups are such that the unsubstituted alkyl groups may be the same or different. Those groups may be methyl, ethyl, propyl or other group each, preferably the both being methyl groups. The compounds that fall under the category (A) are, e.g., 2-amino-2-methyl-1-propanol, 3-amino-3-methyl-2-pentanol, 2,3-dimethyl-3-amino-1-butanol, 2-amino-2-ethyl-1-butanol, 2-amino-2-methyl-3-pentanol, 2-amino-2-methyl-1-butanol, 3-amino-3-methyl-1-butanol, 3-amino-3-methyl-2-butanol, 2-amino-2,3-dimethyl-3-butanol, 2-amino-2,3-dimethyl-1-butanol, and 2-amino-2-methyl-1-pentanol. Among these, 2-amino-2-methyl-1-propanol (AMP) is preferable.

The compounds (B) for use in the invention have in the molecule an alcoholic hydroxyl group and a secondary amino group, said secondary amino group having an N atom bound to a group which has a chain of two or more carbon atoms including the binding carbon atom and an unsubstituted alkyl group which contains 3 or fewer carbon atoms. The chain of two or more carbon atoms including the binding carbon atom is, e.g., a hydroxyl group-substituted alkyl group usually having 2–5 carbon atoms, preferably 2–3 carbon atoms. The compounds belonging to this class (B) are, e.g., 2-(ethylamino)-ethanol, 2-(methylamino)-ethanol, 2-(propylamino)-ethanol, 2-(isopropylamino)-ethanol, 1-(ethylamino)-ethanol, 1-(methylamino)-ethanol, 1-(propylamino)-ethanol, and 1-(isopropylamino)-ethanol. Especially, 2-(ethylamino)-ethanol (EAE) and 2-(methylamino)-ethanol (MAE) are preferred.

Of the hindered amines for use in this invention, the compounds (C) have in the molecule an alcoholic hydroxyl group and a tertiary amino group, at least two groups bound to the tertiary amino group each having a chain of two or more carbon atoms including the binding carbon atom, two of the groups bound to the tertiary amino group being unsubstituted alkyl groups. The two unsubstituted alkyl groups may be the same or different, e.g., methyl, ethyl, propyl, isopropyl, or/and other similar groups. Examples of these compounds are 2-(dimethylamino)-ethanol, 2-(diethylamino)-ethanol, 2-(ethylmethylamino)-ethanol, 1-(dimethylamino)-ethanol, 1-(diethylamino)-ethanol, 1-(ethylmethylamino)-ethanol, 2-(diisopropylamino)-ethanol, 1-(diethylamino)-2-propanol, and 3-(diethylamino)-1-propanol. Particularly desirable is 2-(diethylamino)-ethanol (DEAE).

The hindered amine or amines chosen from among these classes may be used singly or as a mixture.

The concentration of the aqueous hindered amine solution to be used as a $CO_2$ absorbent solution usually ranges from 25 to 65 wt % depending on the type of the hindered amine or amines used.

The present invention is characterized by the use of carbon steel in the equipment members that contact an aqueous hindered amine solution. The carbon steel for use in the invention is a steel with a carbon content of 0.33 wt % or less, preferably 0.20 wt % or less.

To a hindered amine according to the invention is preferably added cupric carbonate [$CuCO_3.Cu(OH)_2.H_2O$]. Cupric carbonate, also known as basic copper carbonate, is added in an amount, in terms of bivalent copper ion, of preferably at least 50 ppm or more, more preferably in the range of 100–300 ppm.

When necessary, a deterioration-retarding agent (stabilizer) may be added to an aqueous hindered amine solution. In reality, the process of the invention causes such scarce deterioration of the hindered amine that the addition is not considered essential.

The temperature of the aqueous hindered amine solution in contact with combustion gas is usually in the range of 30–70° C. The aqueous hindered amine solution that has absorbed $CO_2$ is heated at the regeneration step. The heating temperature is usually 80–130° C.

For the purposes of the invention the term "atmospheric pressure" used here encompasses the pressures in the neighborhood of the atmospheric that permit the operation of a blower or the like to feed a combustion gases to the system.

The process to which the present invention for the $CO_2$ removal from combustion gases can be incorporated is not specially limited. A typical process will now be described with reference to FIG. 1. FIG. 1 shows only major component units, omitting ancillary equipment.

Referring to FIG. 1, the numeral 1 indicates a $CO_2$-removal column; 2, a lower packed bed; 3, an upper packed bed or trays; 4, a $CO_2$-removal column combustion gas inlet; 5, a $CO_2$-free combustion gas outlet; 6, an absorbent solution feed inlet; 7, a nozzle; 8, a combustion gas cooler, which is provided when necessary; 9, a nozzle; 10, a packed bed; 11, a humidifying-cooling water circulating pump; 12, a makeup water line; 13, a $CO_2$-containing absorbent solution discharging pump; 14, a heat exchanger; 15, an absorbent solution regeneration ("regeneration" for short) column; 16, a nozzle; 17, a lower packed bed; 18, a regenerative heater (reboiler); 19, an upper packed bed; 20, a refluxing water pump; 21, a $CO_2$ separator; 22, a recovered $CO_2$ discharge line; 23, a regeneration column reflux condenser; 24, a nozzle; 25, a regeneration column absorbent solution reflux line; 26, a combustion gas feed blower; 27, a cooler; and 28, a regeneration column refluxing water inlet.

In FIG. 1, a combustion gas is forced by the combustion gas feed blower 26 into the combustion gas cooler 8. In the cooler the gas is humidified and cooled through contact with humidifying-cooling water from the nozzle 9 and the packed bed 10. It is then led through the $CO_2$-removal column combustion gas inlet 4 into the $CO_2$-removal column 1. The humidifying-cooling water that has contacted the combustion gas collects at the bottom of the combustion gas cooler 8 and is recycled to the nozzle 9 by the pump 11. Since the humidifying-cooling water is gradually lost by the humidification and cooling of the combustion gas, it is replenished by the makeup feed line 12. When the combustion gas in the humidified and cooled state is to be further cooled, a heat exchanger may be installed between the humidifying-cooling water circulating pump 11 and the nozzle 9 to cool the humidifying-cooling water before it is supplied to the combustion gas cooler 8.

The combustion gas forced into the $CO_2$-removal column 1 is brought into countercurrent contact in the lower packed bed 2 with the absorbent solution at a given concentration being supplied by the nozzle 7. Thus $CO_2$ is absorbed away from the combustion gas by the absorbent solution, and the $CO_2$-free combustion gas flows upward into the upper packed bed 3.

The absorbent solution supplied to the $CO_2$-removal column 1 absorbs $CO_2$ and, because of the heat of reaction due to absorption, it attains a higher temperature than when it is usually is at the feed inlet 6. The $CO_2$-containing absorbent solution is sent by the absorbent solution discharging pump 13 to the heat exchanger 14, where it is heated and then transferred to the absorbent solution regeneration column 15. The adjustment of temperature of the regenerated absorbent solution may be done either by the heat exchanger 14 or, according to the necessity, by a cooler 27 provided between the heat exchanger 14 and the absorbent solution feed inlet 6.

In the regeneration column 15, the absorbent solution is regenerated in the lower packed bed 17 by the heat from the regenerative heater 18. It is then cooled by the heat exchanger 14 and returned to the $CO_2$-removal column 1. In the upper part of the absorbent solution regeneration column 15, the $CO_2$ separated from the absorbent solution comes in contact with the refluxing water from the nozzle 24 in the upper packed bed 19. Then $CO_2$ is cooled by the regeneration column reflux condenser 23 and is flown into the $CO_2$ separator 21, where it is separated from the refluxing water that results from the condensation of water vapor it entrained. By way of the recovered $CO_2$ discharge line 22 it is conducted to a $CO_2$ recovery step. Part of the refluxing water is returned to the regeneration column 15 by the refluxing water pump 20. Another part is fed through the regeneration column refluxing water supply line 25 to the regeneration column refluxing water inlet 28 of the $CO_2$-removal column 1. This regeneration column refluxing water contains a slight amount of the absorbent solution, which comes in contact with the exhaust gas in the upper packed bed 3 of the $CO_2$-removal column 1 and contributes to the removal of a trace amount of $CO_2$ contained in the gas.

The system described above uses carbon steel as the material for the component units that contact the absorbent solution.

As has been detailed above, the use of an aqueous hindered amine solution as an absorbent solution in the removal by absorption of $CO_2$ from combustion gases that contain both oxygen and $CO_2$ in accordance with the invention reduces the corrosive attack to carbon steel as compared with the attack by an absorbent solution of the prior art prepared by adding cupric carbonate to an aqueous MEA solution. Addition of cupric carbonate to the hindered amine further reduces the corrosion of carbon steel. At the same time, the adoption of a hindered amine as an absorbent solution brings an improvement in $CO_2$ absorption performance over that of MEA.

The present invention makes possible the employment of an apparatus built of carbon steel that is available at lower cost than stainless steel. Moreover, the absorbent solution used requires less energy for regeneration than MEA. These combine to permit the $CO_2$ absorption from combustion gases to be carried out as an industrial process.

BRIEF DESCRIPTION OF THE DRAWINGS

FIG. 2 is a graph showing the relationship between the absorption rates of absorbent solutions ($Nm^3CO_2/m^3$ absorbent solution as ordinate) and temperature (° C. as abscissa).

DETAILED DESCRIPTION OF PREFERRED EMBODIMENTS

Figure 1:
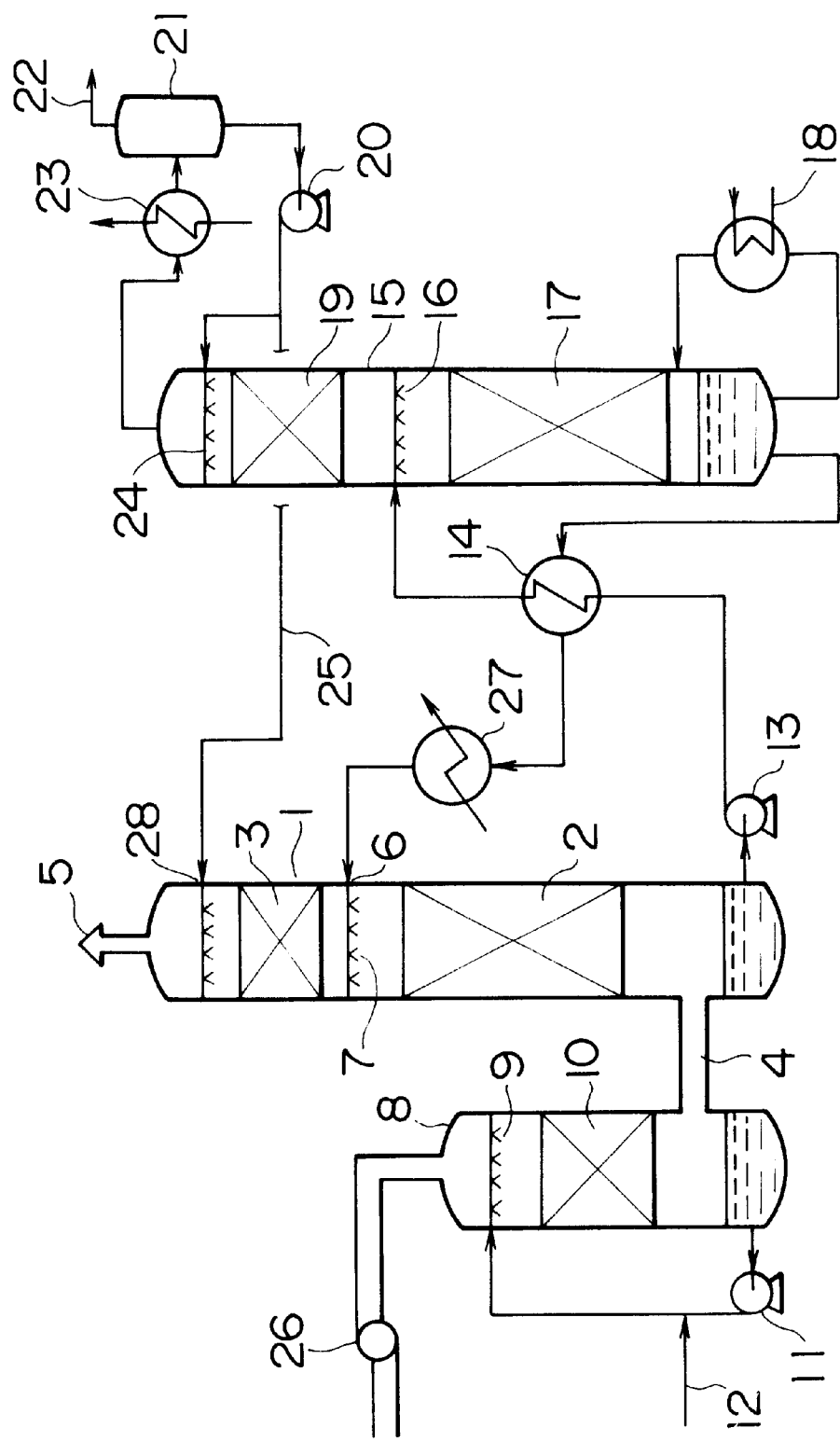
FIG. 1 is a flow diagram of a process into which the present invention can be incorporated.

The present invention is concretely described in connection with the following examples.

EXAMPLES 1–8 & COMPARATIVE EXAMPLE 1

Test specimens of carbon steel (SS41) (each having a surface area of about 1.87 $inch^2$ and weighing 7.5 g) were polished on a series of three polishing papers Nos. 120, 240, and 400, in the order of mention, in conformity with JIS R6252. They were then washed with acetone, vacuum dried, and weighed.

Next, the specimens were transferred into glass testers each filled with 700 ml of an aqueous solution containing 30 wt % of a hindered amine saturated with $CO_2$ beforehand. Each tester was placed in the atmosphere into a two-liter pressure vessel of stainless steel and hermetically sealed. The stainless steel pressure vessel was allowed to stand at 130° C. for 48 hours in a high-temperature drier. The specimen was taken out, rinsed, vacuum dried, and weighed. The test was conducted twice for each hindered amine. The results are summarized in Table 1. In the table the expression (contg. cupric carbonate) is used to mean that the absorbent solution contained 200 ppm of cupric carbonate in terms of bivalent copper ion. For comparison purposes similar tests were conducted with an aqueous solution of 30 wt % MEA. The results are also given in Table 1.

The corrosion rate [mpy, standing for mil (1/1000 in.) per year] was calculated from the weight loss due to corrosion and the surface area.

TABLE 1

| | Aqueous hindered amine solution | Test specimen No. | Corrosion rate (mpy) |
|---|---|---|---|
| Comp.Ex. 1 | (MEA) 30 wt % aq. sol. | 1 2 | 92.95 76.37 |
| Ex. 1 | AMP 30 wt % aq. sol | 1 2 | 4.01 4.31 |
| " 2 | DEAE 30 wt % aq. sol. | 1 2 | 2.65 2.88 |
| " 3 | MAE 30 wt % aq. sol. | 1 2 | 7.04 6.96 |
| " 4 | EAE 30 wt % aq. sol. | 1 2 | 3.10 3.63 |
| " 5 | AMP 30 wt % aq. sol. contg. cupric carbonate | 1 2 | 2.80 2.80 |
| " 6 | MAE 30 wt % aq. sol. contg. cupric carbonate | 1 2 | 3.03 2.35 |
| " 7 | DEAE 30 wt % aq. sol. contg. cupric carbonate | 1 2 | 1.44 1.89 |
| " 8 | EAE 30 wt % aq. sol. contg. cupric carbonate | 1 2 | 2.12 2.04 |

REFERENCE EXAMPLES & REFERENCE COMPARATIVE EXAMPLE

Into a glass reactor (flask) placed in a thermostatic chamber was placed 50 ml of an aqueous solution containing 30 wt % of a hindered amine. A test gas was passed at a flow rate of 1 l/min at the atmospheric pressure through the aqueous solution while the latter was being stirred at 40° C. The test gas used was a model of combustion gas at 40° C. composed of 10 mol % $CO_2$, 3 mol % $O_2$, and 87 mol % $N_2$.

The test gas was continuously passed until the $CO_2$ concentrations at the inlet and outlet became equal. At that point the $CO_2$ content in the absorbent solution was measured using a $CO_2$ analyzer (total organic carbon meter) and the $CO_2$ saturation absorption rate was found. A similar test was repeated at 60° C. and 80° C. By way of comparison, similar tests were performed with an aqueous MEA solution.

The results are shown in Table 2 (at 40° C.) and in FIG. 2. In Table 2, (1) represents Reference Comparative Example and (2)–(5) represent Reference Examples. The vertical axis in FIG. 2 is in the unit of $Nm^3CO_2/Nm^3$ aqueous solution and the horizontal axis is the temperature (° C.).

From a graph showing the relationship between the $CO_2$ concentration at the outlet of the flask and the gas passage time, the tangential inclination at the start of gas passage was found, and the initial $CO_2$ absorption velocity of each absorbent solution was found from its ratio to that of an aqueous MEA solution at the same concentration. The results are also given in Table 2.

TABLE 2

| Test No. | Test absorbent sol. (30 wt % aq. sol.) | CO$_2$ saturation absorption rate | | Initial absorption velocity (aq. MEA sol. = 1) |
| --- | --- | --- | --- | --- |
| | | CO$_2$ mol/ amine mol | Nm$^3$CO$_2$/ Nm$^3$ abs. sol. | |
| (1) | MEA | 0.56 | 61.2 | 1.00 |
| (2) | AMP | 0.72 | 54.4 | 0.69 |
| (3) | MAE | 0.63 | 56.0 | 1.00 |
| (4) | EAE | 0.68 | 51.3 | 0.91 |
| (5) | DEAE | 0.75 | 42.2 | 0.36 |

As Table 2 indicates, the initial absorption velocities of the aqueous hindered amine solutions (absorbent solutions) used in the present invention (excluding the solution of DEAE) are not so low as expected but are equal to or somewhat lower than that of the MEA solution. There is a possibility of the absorption velocities being improved by the addition of an absorption accelerator.

On the other hand, all the CO$_2$ absorption rates per unit mole of the individual hindered amines are greater than that of MEA. The absorption rates per unit amount of the absorbent solutions vary with the type of the hindered amines used, the rates of the MAE and AMP solutions being somewhat lower than that of the MEA solution.

FIG. 2 shows that when a hindered amine such as AMP is used, the decrease in the CO$_2$ absorption rate with the increase in temperature of the absorbent solution is greater than when MEA is used. This suggests the possibility of saving more thermal energy for the regeneration of the absorbent solution than with MEA.

What is claimed is:

1. A process for removing carbon dioxide from a combustion gas which comprises:

in an apparatus made from carbon steel, bringing a combustion gas which contains oxygen gas and carbon dioxide into contact with an aqueous solution of a hindered amine selected from the group consisting of 2-amino-2-methyl-1-propanol (AMP), 2-(ethylamino)-ethanol (EAE), 2-(methylamino)-ethanol (MAE), and 2-(diethylamino)-ethanol (DEAE) containing cupric carbonate, at the atmospheric pressure, allowing the aqueous solution to absorb carbon dioxide from the combustion gas, and, in the ensuing step, heating the aqueous solution that has absorbed carbon dioxide, to liberate carbon dioxide and regenerate the aqueous solution, and circulating the regenerated solution for reuse.

2. The process as claimed in claim 1, wherein the hindered amine is 2-amino-2-methyl-1-propanol.

3. The process as claimed in claim 1, wherein the hindered amine is 2-(methylamino)-ethanol.

4. The process as claimed in claim 1, wherein the hindered amine is 2-(diethylamino)-ethanol.

5. The method according to claim 1, wherein the concentration of the aqueous hindered amine solution used as the carbon dioxide absorbent solution is 25–65%.

6. The process of claim 1, wherein the aqueous solution is 30 wt % of the hindered amine.

7. A process for reducing the corrosion rate of carbon steel from an aqueous solution of a hindered amine selected from the group consisting of 2-amino-2-methyl-1-propanol (AMP), 2-(ethylamino)-ethanol (EAE), 2-(methylamino)-ethanol (MAE), and 2-(diethylamino)-ethanol (DEAE) containing cupric carbonate employed in a process for removing carbon dioxide from a combustion gas which comprises: in an apparatus made from carbon steel, bringing the combustion gas containing oxygen gas and carbon dioxide into contact with the aqueous solution at the atmospheric pressure, allowing the aqueous solution to absorb carbon dioxide from the combustion gas, and, in the ensuing step, heating the aqueous solution that has absorbed carbon dioxide, to liberate carbon dioxide and regenerate the aqueous solution, and circulating the regenerated solution for reuse.

8. The process as claimed in claim 7, wherein the hindered amine is 2-amino-2-methyl-1-propanol.

9. The process as claimed in claim 7, wherein the hindered amine is 2-(methylamino)-ethanol.

10. The process as claimed in claim 7, wherein the hindered amine is 2-(diethylamino)-ethanol.

11. The method according to claim 7, wherein the concentration of the aqueous hindered amine solution used as the carbon dioxide absorbent solution is 25–65%.

12. The process of claim 7, wherein the aqueous solution is 30 wt % of the hindered amine.

* * * * *